US012606005B2

(12) United States Patent
Shibata et al.

(10) Patent No.: US 12,606,005 B2
(45) Date of Patent: Apr. 21, 2026

(54) HYBRID ELECTRIC VEHICLE

(71) Applicant: TOYOTA JIDOSHA KABUSHIKI KAISHA, Toyota (JP)

(72) Inventors: Hiroyuki Shibata, Odawara (JP); Tetsuro Kobayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/032,692

(22) Filed: Jan. 21, 2025

(65) Prior Publication Data

US 2025/0360784 A1 Nov. 27, 2025

(30) Foreign Application Priority Data

May 24, 2024 (JP) ................................ 2024-085209

(51) Int. Cl.
| | |
|---|---|
| *B60K 6/365* | (2007.10) |
| *B60K 6/26* | (2007.10) |
| *B60K 6/40* | (2007.10) |
| *B60K 6/442* | (2007.10) |
| *F16H 3/72* | (2006.01) |
| *F16H 37/08* | (2006.01) |
| *F16H 57/02* | (2012.01) |
| *H02K 7/116* | (2006.01) |

(52) U.S. Cl.
CPC ................. *B60K 6/40* (2013.01); *B60K 6/26* (2013.01); *B60K 6/365* (2013.01); *B60K 6/442* (2013.01); *F16H 3/727* (2013.01); *F16H 37/0806* (2013.01); *B60Y 2200/92* (2013.01); *B60Y 2400/73* (2013.01); *B60Y 2400/80* (2013.01); *F16H 2057/02034* (2013.01); *F16H 2200/0021* (2013.01); *H02K 7/116* (2013.01)

(58) Field of Classification Search
CPC . B60K 6/40; B60K 6/26; B60K 6/365; B60K 6/442; F16H 37/0806; F16H 3/727; F16H 2057/02034; F16H 2200/0021; B60Y 2200/92; B60Y 2400/73; B60Y 2400/80; H02K 7/116
See application file for complete search history.

(56) References Cited

U.S. PATENT DOCUMENTS

| | | | |
|---|---|---|---|
| 7,822,524 B2 * | 10/2010 | Tabata .................. | B60W 20/30 |
| | | | 701/87 |
| 2006/0102409 A1 * | 5/2006 | Kamada .................. | B60L 1/003 |
| | | | 180/249 |
| 2022/0153118 A1 | 5/2022 | Shibata et al. | |

FOREIGN PATENT DOCUMENTS

| | | | | | |
|---|---|---|---|---|---|
| JP | 2019073158 A | * | 5/2019 | .............. | B60K 6/40 |
| JP | 2019131031 A | * | 8/2019 | ............. | B60K 6/365 |
| JP | 2022-079981 A | | 5/2022 | | |

* cited by examiner

*Primary Examiner* — Tisha D Lewis
(74) *Attorney, Agent, or Firm* — SoraIP, Inc.

(57) ABSTRACT

In a hybrid electric vehicle, (a) an engine and a first electric motor are disposed to be rotatable about a first axis, (b) a second electric motor, a reduction mechanism, and a differential gear are disposed to be rotatable about a second axis parallel with the first axis, (c) the second electric motor, a first planetary gear device, a second planetary gear device, and the differential gear are disposed in order from the first electric motor side to the engine side in the direction of the second axis, and (d) a second rotor shaft, a ring gear of the first planetary gear device, and a carrier of the second planetary gear device are respectively coupled to a sun gear of the first planetary gear device, a sun gear of the second planetary gear device, and the differential gear.

4 Claims, 3 Drawing Sheets

HYBRID ELECTRIC VEHICLE

CROSS-REFERENCE TO RELATED APPLICATION

This application claims priority to Japanese Patent Application No. 2024-085209 filed on May 24, 2024. The disclosure of the above-identified application, including the specification, drawings, and claims, is incorporated by reference herein in its entirety.

BACKGROUND

1. Technical Field

The present disclosure relates to a hybrid electric vehicle including an engine, a first electric motor that is rotated and driven by the engine, a second electric motor, a reduction mechanism that reduces motive power of the second electric motor, and a differential gear that receives the motive power from the reduction mechanism.

2. Description of Related Art

A hybrid electric vehicle has been known that includes an engine, a first electric motor that is rotated and driven by the engine, a second electric motor, a reduction mechanism that reduces motive power of the second electric motor, and a differential gear that receives the motive power from the reduction mechanism. For example, a hybrid electric vehicle described in Japanese Unexamined Patent Application Publication No. 2022-79981 (JP 2022-79981 A) is the known hybrid electric vehicle. In the hybrid electric vehicle described in JP 2022-79981 A, (a) an engine and a first electric motor are each disposed to be rotatable about a first axis, (b) a second electric motor, a reduction mechanism, and a differential gear are each disposed to be rotatable about a second axis parallel with the first axis, and (c) the second electric motor, the reduction mechanism, and the differential gear are disposed in order from the first electric motor side to the engine side in the direction of the second axis. In addition, the hybrid electric vehicle described in JP 2022-79981 A includes a stepped-pinion planetary gear device as the reduction mechanism. The "stepped-pinion planetary gear device" is a planetary gear device including a diametrically larger pinion and a diametrically smaller pinion that each rotate to allow for no relative rotation. In the planetary gear device, the diametrically larger pinion receives motive power from a sun gear that engages with the diametrically larger pinion. The diametrically smaller pinion is engaged with a ring gear fixed to a non-rotation member and outputs motive power from a carrier. The stepped-pinion planetary gear device is a reduction mechanism that makes it easier to increase a reduction ratio and makes it more difficult to decrease the efficiency of motive power transmission.

SUMMARY

It is, however, easy to restrain the stepped-pinion planetary gear device from increasing in length in the direction of an axis of the stepped-pinion planetary gear device, but the stepped-pinion planetary gear device easily increases in outside diameter with respect to the axis. To dispose the engine that protrudes in the radial direction in which the first axis serves as a center and the stepped-pinion planetary gear device that protrudes in the radial direction in which the second axis serves as a center while preventing the engine and the stepped-pinion planetary gear device from physically overlapping in a case where the engine and the stepped-pinion planetary gear device are disposed at positions overlapping in the direction of the first axis (=the same direction as the direction of the second axis), it may be therefore necessary to increase the inter-axis distance between the first axis and the second axis. If the inter-axis distance is increased between the first axis and the second axis, the engine disposed to be rotatable about the first axis and the respective devices of a power train disposed to be rotatable about the second axis increase in size as a whole. For example, the vehicle thus has more unfavorable aerodynamic characteristics and a lower degree of freedom of vehicle design.

The present disclosure has been devised in view of the circumstances. An object of the present disclosure is to provide a hybrid electric vehicle that makes it possible to restrain an engine and respective devices of a power train from increasing in size as a whole.

The gist of the present disclosure resides in a hybrid electric vehicle including: an engine; a first electric motor configured to be rotated and driven by the engine; a second electric motor; a reduction mechanism configured to reduce motive power of the second electric motor; and a differential gear configured to receive the motive power from the reduction mechanism. In the hybrid electric vehicle, (a) the engine and the first electric motor are each disposed to be rotatable about a first axis, (b) the reduction mechanism includes a first planetary gear device and a second planetary gear device, (c) the second electric motor, the first planetary gear device, the second planetary gear device, and the differential gear are each disposed to be rotatable about a second axis parallel with the first axis, (d) the second electric motor, the first planetary gear device, the second planetary gear device, and the differential gear are disposed in order from the first electric motor side to the engine side in the direction of the second axis, and (e) an output shaft of the second electric motor is coupled to a sun gear of the first planetary gear device, a ring gear of the first planetary gear device is coupled to a sun gear of the second planetary gear device, and a carrier of the second planetary gear device is coupled to the differential gear.

According to the present disclosure, (a) the engine and the first electric motor are each disposed to be rotatable about the first axis, (b) the reduction mechanism includes the first planetary gear device and the second planetary gear device, (c) the second electric motor, the first planetary gear device, the second planetary gear device, and the differential gear are each disposed to be rotatable about the second axis parallel with the first axis, (d) the second electric motor, the first planetary gear device, the second planetary gear device, and the differential gear are disposed in order from the first electric motor side to the engine side in the direction of the second axis, and (e) the output shaft of the second electric motor is coupled to the sun gear of the first planetary gear device, the ring gear of the first planetary gear device is coupled to the sun gear of the second planetary gear device, and the carrier of the second planetary gear device is coupled to the differential gear. The configuration of (e) restrains the reduction mechanism including the first planetary gear device and the second planetary gear device from having a larger outside diameter with respect to the second axis while allowed to have a higher reduction ratio. As described above, the reduction mechanism is restrained from having a larger outside diameter with respect to the second axis. In addition, the disposition of (d) makes it easier to decrease the outside diameters of the respective devices of the power train disposed to protrude from the first electric motor side to the engine side in the direction of the second axis and be rotatable about the second axis. It is thus possible to dispose the engine disposed to be rotatable about the first axis and the respective devices of the power train disposed to be rotatable about the second axis parallel with the first axis while restraining the inter-axis distance from increasing between the first axis and the second axis. That is, the engine and the respective devices of the power train are restrained from increasing in size as a whole.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Respective embodiments of the present disclosure will be described in detail below with reference to the drawings. It is to be noted that the drawings are simplified or modified as appropriate unless otherwise stated in the respective embodiments. The dimensional ratio, the shape, and the like of each section are not necessarily illustrated accurately.

First Embodiment

Figure 1:
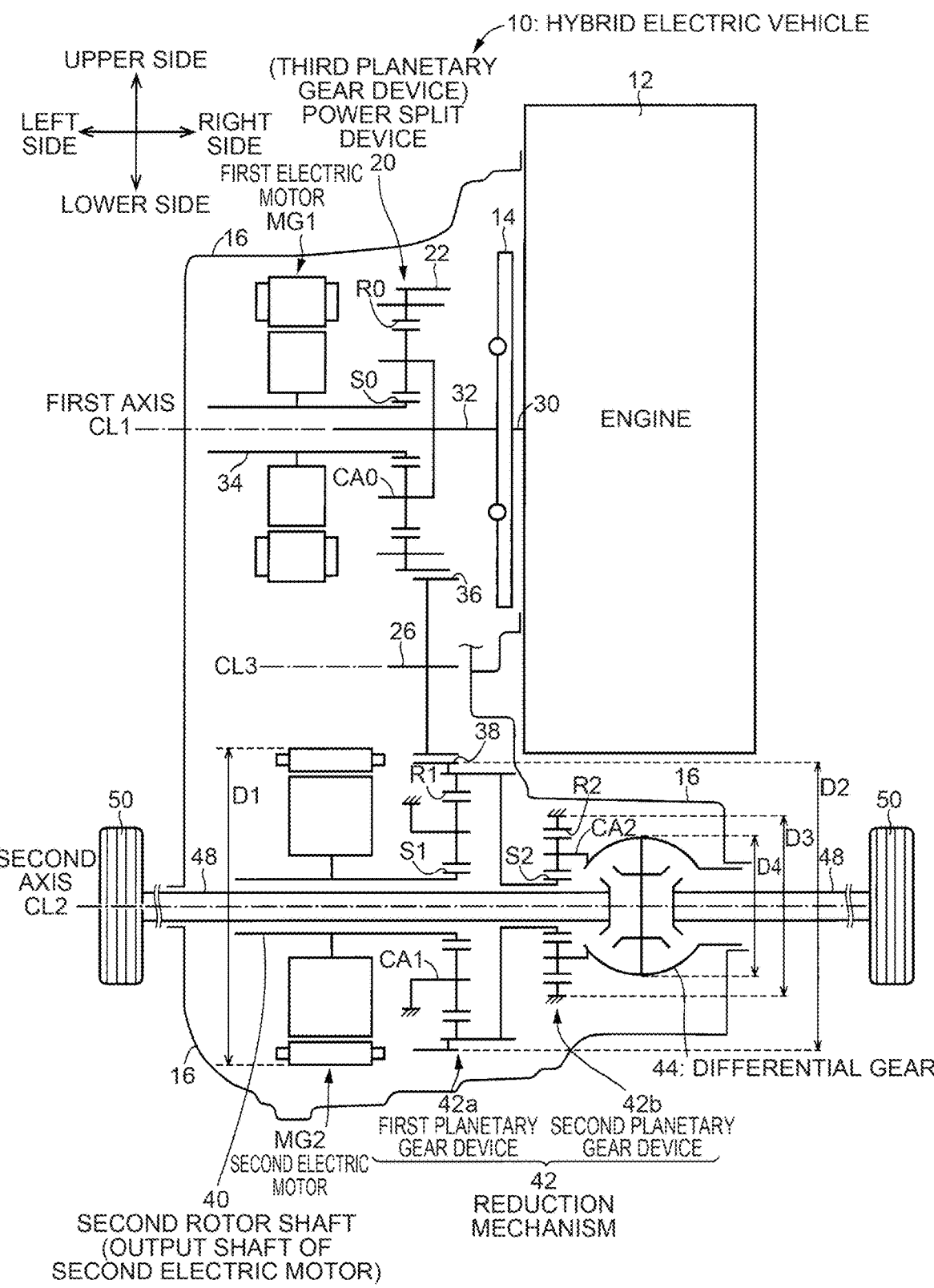
FIG. 1 is a schematic configuration diagram of a hybrid electric vehicle according to a first embodiment of the present disclosure.

FIG. 1 is a schematic configuration diagram of a hybrid electric vehicle 10 (referred to simply as the "vehicle 10" below) according to a first embodiment of the present disclosure. FIG. 1 illustrates the upper side and the lower side in the direction of a vertical line of the vehicle 10 and the left side and the right side in the vehicle width direction by arrows. FIG. 1 is a rear view of the vehicle 10 facing forward.

The vehicle 10 includes an engine 12, a crankshaft 30, a damper 14, an input shaft 32, a power split device 20, a first electric motor MG1, a countershaft 26, a second electric motor MG2, a reduction mechanism 42 including a first planetary gear device 42a and a second planetary gear device 42b, a differential gear 44, a pair of axles 48, and a pair of driving wheels 50. The reduction mechanism 42 reduces motive power output from the second electric motor MG2 and outputs the reduced motive power to the differential gear 44. The respective devices of the damper 14, the input shaft 32, the power split device 20, the first electric motor MG1, the countershaft 26, the second electric motor MG2, the first planetary gear device 42a, the second planetary gear device 42b, and the differential gear 44 are accommodated in a transaxle case 16. FIG. 1 illustrates the respective devices shown in the transaxle case 16 by reflecting the positional relationship between the respective devices in the up-down direction and the left-right direction.

The engine 12, the damper 14, the input shaft 32, the power split device 20, and the first electric motor MG1 are each disposed to be rotatable about a first axis CL1.

The engine 12 is a well-known internal combustion engine. The damper 14 is a well-known device that absorbs a fluctuation in motive power input from the crankshaft 30 of the engine 12 and outputs the motive power to the input shaft 32. It is to be noted that motive power, driving force, force (=power), and torque herein have the same meaning unless distinguished in particular.

The first electric motor MG1 and the second electric motor MG2 are electric rotating machines, that is, so-called motor generators each having a function of an electric motor and a function of an electric power generator. The first electric motor MG1 and the second electric motor MG2 each have a well-known configuration.

The power split device 20 is a well-known power split device including, for example, a well-known single-pinion planetary gear device. In the planetary gear device included in the power split device 20, a first rotor shaft 34 that is the rotor shaft of the first electric motor MG1 is coupled to a sun gear S0, the engine 12 is coupled to a carrier CA0 through the input shaft 32 and the damper 14, and a counter drive gear 22 is coupled to a ring gear R0. The planetary gear device included in the power split device 20 corresponds to a "third planetary gear device" according to the present disclosure. The sun gear S0 corresponds to a "sun gear of the third planetary gear device" according to the present disclosure. The carrier CA0 corresponds to a "carrier of the third planetary gear device" according to the present disclosure.

Motive power output from the engine 12 is mechanically split into the first electric motor MG1 and the counter drive gear 22 by the power split device 20 through the damper 14 and the input shaft 32. The first electric motor MG1 is rotated and driven by the motive power of the engine 12 split into the first electric motor MG1 by the power split device 20. For example, the first electric motor MG1 generates electric power by using the motive power of the engine 12 split into the first electric motor MG1. The power split device 20 functions as an electric continuously variable transmission in which the differential state of the power split device 20 is controlled by controlling the operation state of the first electric motor MG1. Electric power generated by the first electric motor MG1 is used to charge an unillustrated battery or drive the second electric motor MG2.

The second electric motor MG2, the first planetary gear device 42a, the second planetary gear device 42b, the differential gear 44, and the axles 48 are each disposed to be rotatable about a second axis CL2. The second axis CL2 is parallel with the first axis CL1. The first axis CL1 and the second axis CL2 are parallel with each other, and the direction of the first axis CL1 and the direction of the second axis CL2 are thus the same direction. The second axis CL2 extends immediately below the engine 12. The second electric motor MG2, the first planetary gear device 42a, the second planetary gear device 42b, and the differential gear 44 are disposed in order from the first electric motor MG1 side to the engine 12 side in the direction of the second axis CL2. As described above, the engine 12, the damper 14, the power split device 20, and the first electric motor MG1 are disposed in order from one side to the other side in the direction of the second axis CL2 (=the direction that is the same as the direction of the first axis CL1), and the second electric motor MG2, the first planetary gear device 42a, the second planetary gear device 42b, and the differential gear 44 are disposed in order from the other side to the one side.

The first electric motor MG1 and the second electric motor MG2 are disposed at positions overlapping in the direction of the second axis CL2. That is, the second electric motor MG2 is disposed at a position overlapping with the position of the first electric motor MG1 as viewed in the radial direction in which the second axis CL2 serves as a center. In the present embodiment, the second electric motor MG2 is disposed immediately below the first electric motor MG1. The engine 12, and the second planetary gear device 42b and the differential gear 44 are disposed at positions overlapping in the direction of the second axis CL2. That is, the second planetary gear device 42b and the differential gear 44 are disposed at positions overlapping with the position of the engine 12 as viewed in the radial direction in which the second axis CL2 serves as a center. In the present embodiment, the second planetary gear device 42b and the differential gear 44 are disposed immediately below the engine 12. That is, the second planetary gear device 42b included in part of the reduction mechanism 42 and the differential gear 44 are disposed to protrude immediately below the engine 12 in the direction of the second axis CL2.

A second rotor shaft 40 that is the rotor shaft of the second electric motor MG2 is coupled to a sun gear S1 of the first planetary gear device 42a. The second rotor shaft 40 corresponds to an "output shaft of a second electric motor" according to the present disclosure. The sun gear S1 corresponds to a "sun gear of a first planetary gear device" according to the present disclosure. A non-rotation member (e.g., transaxle case 16) is coupled to a carrier CA1 of the first planetary gear device 42a. A sun gear S2 of the second planetary gear device 42b is coupled to a ring gear R1 of the first planetary gear device 42a and the ring gear R1 is engaged with a counter driven gear 36 described below through an outer circumference gear 38. The ring gear R1 corresponds to a "ring gear of the first planetary gear device" according to the present disclosure. The outer circumference gear 38 is a gear provided to the outer circumference section of the ring gear R1. The sun gear S2 corresponds to a "sun gear of a second planetary gear device" according to the present disclosure. A differential case that is the case section of the differential gear 44 is coupled to a carrier CA2 of the second planetary gear device 42b. The carrier CA2 corresponds to a "carrier of the second planetary gear device" according to the present disclosure. The non-rotation member (e.g., transaxle case 16) is coupled to a ring gear R2 of the second planetary gear device 42b. As described above, the regions between the second electric motor MG2, the first planetary gear device 42a, the second planetary gear device 42b, and the differential gear 44 are coupled to restrain the first planetary gear device 42a and the second planetary gear device 42b from having larger outside diameters with respect to the second axis CL2 while allowing the first planetary gear device 42a and the second planetary gear device 42b to have higher reduction ratios.

For example, an outside diameter D2 [mm] (<D1) of the first planetary gear device 42a is smaller than an outside diameter D1 [mm] of the second electric motor MG2, an outside diameter D3 [mm] (<D2) of the second planetary gear device 42b is smaller than the outside diameter D2 of the first planetary gear device 42a, and an outside diameter D4 [mm] (<D3) of the differential gear 44 is smaller than the outside diameter D3 of the second planetary gear device 42b. As described above, the respective devices of the power train disposed to be rotatable about the second axis CL2 have smaller outside diameters from the first electric motor MG1 side to the engine 12 side in the direction of the second axis CL2.

The differential gear 44 is a well-known differential gear that transmits the driving torques equal to each other to the driving wheels 50 through the axles 48 upon receiving input motive power while permitting a rotation speed difference as appropriate.

The countershaft 26 is a rotation member provided to be rotatable about a third axis CL3. The third axis CL3 is parallel with the first axis CL1 and the second axis CL2. The countershaft 26 is provided with the counter driven gear 36 to allow for no relative rotation. The counter driven gear 36 is engaged with the counter drive gear 22 and engaged with the outer circumference gear 38. In the power split device 20, positive engine torque Te [N·m] is input to the carrier CA0. Meanwhile, first electric motor torque Tmg1 [N·m] that is negative reaction torque by the first electric motor MG1 is input to the sun gear S0. The first electric motor torque Tmg1 is output torque of the first electric motor MG1. The ring gear R0 of the power split device 20 thus receives positive engine direct torque Td [N·m] in positive rotation. As described above, part of the engine torque Te is transmitted to the ring gear R1 of the first planetary gear device 42a through the outer circumference gear 38 as the engine direct torque Td. The engine torque Te corresponds to "motive power of an engine" according to the present disclosure.

According to the present embodiment, (a) the engine 12 and the first electric motor MG1 are each disposed to be rotatable about the first axis CL1, (b) the reduction mechanism 42 includes the first planetary gear device 42a and the second planetary gear device 42b, (c) the second electric motor MG2, the first planetary gear device 42a, the second planetary gear device 42b, and the differential gear 44 are each disposed to be rotatable about the second axis CL2 parallel with the first axis CL1, (d) the second electric motor MG2, the first planetary gear device 42a, the second planetary gear device 42b, and the differential gear 44 are disposed in order from the first electric motor MG1 side to the engine 12 side in the direction of the second axis CL2, and (e) the second rotor shaft 40 is coupled to the sun gear S1 of the first planetary gear device 42a, the ring gear R1 of the first planetary gear device 42a is coupled to the sun gear S2 of the second planetary gear device 42b, and the carrier CA2 of the second planetary gear device 42b is coupled to the differential gear 44. The configuration of (e) restrains the reduction mechanism 42 including the first planetary gear device 42a and the second planetary gear device 42b from having a larger outside diameter with respect to the second axis CL2 while the reduction mechanism 42 is allowed to have a higher reduction ratio. As described above, the reduction mechanism 42 is restrained from having a larger outside diameter with respect to the second axis CL2. In addition, the disposition of (d) makes it easier to decrease the outside diameters of the respective devices (the reduction mechanism 42 in particular) of the power train disposed to protrude from the first electric motor MG1 side to the engine 12 side in the direction of the second axis CL2 and be rotatable about the second axis CL2. It is thus possible to dispose the engine 12 disposed to be rotatable about the first axis CL1 and the respective devices of the power train disposed to be rotatable about the second axis CL2 parallel with the first axis CL1 while restraining the inter-axis distance from increasing between the first axis CL1 and the second axis CL2. That is, the engine 12 and the respective devices of the power train are restrained from increasing in size as a whole. For example, the engine 12 and the respective devices of the power train are restrained from increasing in size as a whole in the up-down direction, thereby restraining the vehicle 10 from having more unfavorable aerodynamic characteristics, and increasing the degree of freedom of appearance design selectable for the vehicle 10.

According to the present embodiment, the ring gear R1 of the first planetary gear device 42*a* is coupled to the engine 12 such that the engine torque Te is transmitted to the ring gear R1 of the first planetary gear device 42*a* as the engine direct torque Td. As described above, the ring gear R1 of the first planetary gear device 42*a* is structured to add up the engine direct torque Td and second electric motor torque Tmg2 [N·m]. It is thus possible to control, for example, the engine 12 in an efficient operation state and perform control to transmit necessary driving torques to the driving wheels 50. The second electric motor torque Tmg2 is output torque of the second electric motor MG2 and corresponds to "motive power of a second electric motor" according to the present disclosure.

According to the present embodiment, (a) the power split device 20 is included that includes a single-pinion planetary gear device disposed to be rotatable about the first axis CL1 and (b) the engine 12 is coupled to the carrier CA0 of the power split device 20 and the first electric motor MG1 is coupled to the sun gear S0 of the power split device 20. The power split device 20 is thus disposed to be rotatable about the first axis CL1 as with the engine 12, and the rotation speed of the engine 12 is increased and transmitted to the first electric motor MG1. As described above, in a case where the engine 12 is coupled to the carrier CA0 of the power split device 20 and the first electric motor MG1 is coupled to the sun gear S0 of the power split device 20, the first electric motor MG1 is easier to rotate at high speed and the first electric motor MG1 has higher electric power generation efficiency than in a case where the engine 12 is not coupled to the carrier CA0 of the power split device 20 and the first electric motor MG1 is not coupled to the sun gear S0 of the power split device 20.

Second Embodiment

Figure 2:
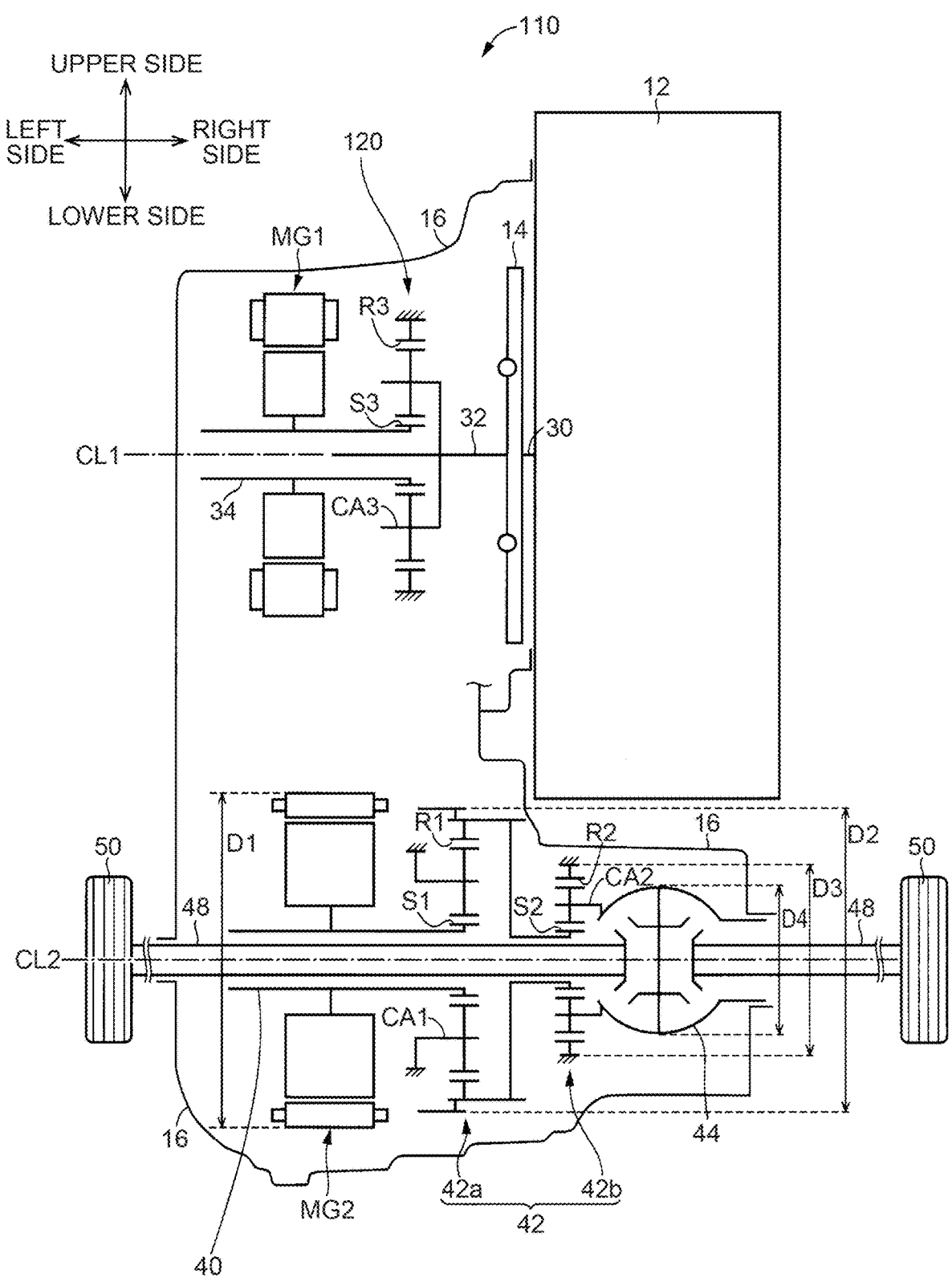
FIG. 2 is a schematic configuration diagram of a hybrid electric vehicle according to a second embodiment of the present disclosure.

FIG. 2 is a schematic configuration diagram of a hybrid electric vehicle 110 (referred to simply as the "vehicle 110" below) according to a second embodiment of the present disclosure. FIG. 2 illustrates the upper side and the lower side in the direction of a vertical line of the vehicle 110 and the left side and the right side in the vehicle width direction by arrows. FIG. 2 is a rear view of the vehicle 110 facing forward. FIG. 2 illustrates the respective devices shown in the transaxle case 16 by reflecting the positional relationship between the respective devices in the up-down direction and the left-right direction.

The vehicle 110 has substantially the same configuration as the configuration of the vehicle 10 according to the first embodiment described above, but is different chiefly in that vehicle 110 has a configuration in which motive power of the engine 12 is transmitted to none of the driving wheels 50. Different portions from the first embodiment will be therefore described chiefly, and the substantially common portions will be denoted by the same reference sign and the description thereof will be omitted as appropriate.

The first electric motor MG1 according to the present embodiment is an electric rotating machine, for example, a so-called motor generator having at least a function of an electric power generator among a function of an electric motor and the function of the electric power generator.

The vehicle 110 includes a speed-increasing planetary gear device 120 instead of the power split device 20 of the vehicle 10 according to the first embodiment. In addition, the vehicle 110 is not provided with the countershaft 26, the counter drive gear 22, the counter driven gear 36, and the outer circumference gear 38 included in the vehicle 10 according to the first embodiment.

The speed-increasing planetary gear device 120 is, for example, a single-pinion planetary gear device. The first electric motor MG1 is coupled to a sun gear S3 of the speed-increasing planetary gear device 120. The engine 12 is coupled to a carrier CA3 of the speed-increasing planetary gear device 120 through the input shaft 32 and the damper 14. The non-rotation member (e.g., transaxle case 16) is coupled to a ring gear R3 of the speed-increasing planetary gear device 120. In the speed-increasing planetary gear device 120, the rotation of the engine 12 is input to the carrier CA3, and the rotation speed is increased and output from the sun gear S3 to the first electric motor MG1. The first electric motor MG1 is rotated and driven by receiving motive power of the engine 12 through the speed-increasing planetary gear device 120. The speed-increasing planetary gear device 120 corresponds to the "third planetary gear device" according to the present disclosure. The sun gear S3 corresponds to the "sun gear of the third planetary gear device" according to the present disclosure. The carrier CA3 corresponds to the "carrier of the third planetary gear device" according to the present disclosure.

According to the present embodiment, as in the first embodiment described above, (a) the engine 12 and the first electric motor MG1 are each disposed to be rotatable about the first axis CL1, (b) the reduction mechanism 42 includes the first planetary gear device 42*a* and the second planetary gear device 42*b*, (c) the second electric motor MG2, the first planetary gear device 42*a*, the second planetary gear device 42*b*, and the differential gear 44 are each disposed to be rotatable about the second axis CL2 parallel with the first axis CL1, (d) the second electric motor MG2, the first planetary gear device 42*a*, the second planetary gear device 42*b*, and the differential gear 44 are disposed in order from the first electric motor MG1 side to the engine 12 side in the direction of the second axis CL2, and (e) the second rotor shaft 40 is coupled to the sun gear S1 of the first planetary gear device 42*a*, the ring gear R1 of the first planetary gear device 42*a* is coupled to the sun gear S2 of the second planetary gear device 42*b*, and the carrier CA2 of the second planetary gear device 42*b* is coupled to the differential gear 44. An effect based on the components and similar to the effect of the first embodiment is thus attained.

According to the present embodiment, (a) the speed-increasing planetary gear device 120 is included that includes a single-pinion planetary gear device disposed to be rotatable about the first axis CL1 and (b) the engine 12 is coupled to the carrier CA3 of the speed-increasing planetary gear device 120 and the first electric motor MG1 is coupled to the sun gear S3 of the speed-increasing planetary gear device 120. The speed-increasing planetary gear device 120 is thus disposed to be rotatable about the first axis CL1 as with the engine 12, and the rotation speed of the engine 12 is increased and transmitted to the first electric motor MG1. This facilitates the first electric motor MG1 to rotate at high speed and increases the electric power generation efficiency of the first electric motor MG1. Preferably, for example, in a case where the first electric motor MG1 has a small diameter and is configured to be capable of efficiently generating electric power at high rotation speed, the first electric motor MG1 has higher electric power generation efficiency and it is easier to restrain the inter-axis distance from increasing between the first axis CL1 and the second axis CL2 than in a case where the first electric motor MG1 does not have a small diameter and is not configured to be capable of efficiently generating electric power at high rotation speed.

Third Embodiment

Figure 3:
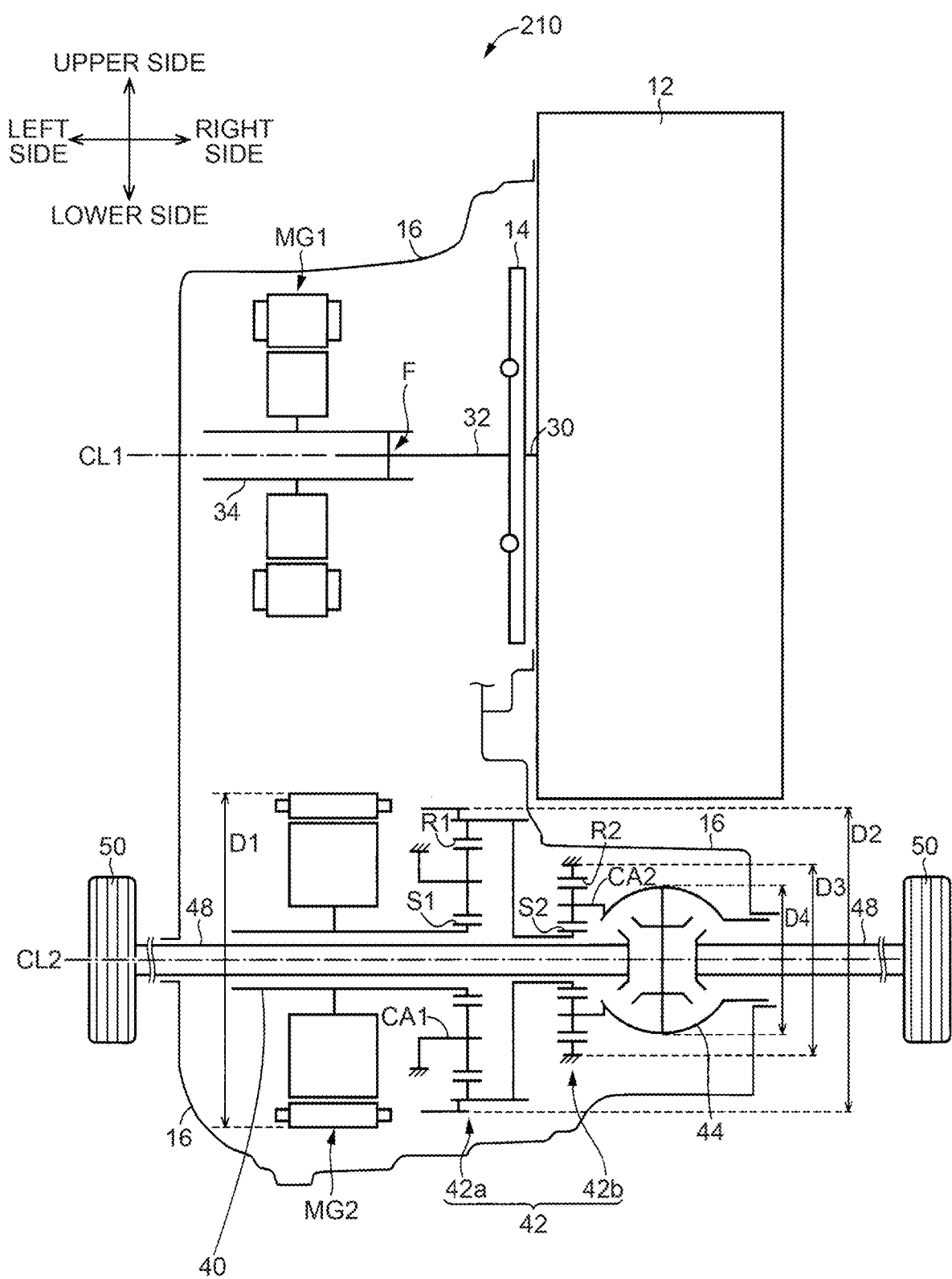
FIG. 3 is a schematic configuration diagram of a hybrid electric vehicle according to a third embodiment of the present disclosure.

FIG. 3 is a schematic configuration diagram of a hybrid electric vehicle 210 (referred to simply as the "vehicle 210" below) according to a third embodiment of the present disclosure. FIG. 3 illustrates the upper side and the lower side in the direction of a vertical line of the vehicle 210 and the left side and the right side in the vehicle width direction by arrows. FIG. 3 is a rear view of the vehicle 210 facing forward. FIG. 3 illustrates the respective devices shown in the transaxle case 16 by reflecting the positional relationship between the respective devices in the up-down direction and the left-right direction.

The vehicle 210 has substantially the same configuration as the configuration of the vehicle 110 according to the second embodiment described above, but is different chiefly in that the vehicle 210 does not include the speed-increasing planetary gear device 120. Different portions from the second embodiment will be therefore described chiefly, and the substantially common portions will be denoted by the same reference sign and the description thereof will be omitted as appropriate.

The vehicle 210 does not include the speed-increasing planetary gear device 120 of the vehicle 110 according to the second embodiment. The input shaft 32 is subjected, for example, to spline fitting into the first rotor shaft 34 in the fitting section F to allow for no relative rotation. As described above, the engine 12 and the first electric motor MG1 are directly coupled to have the same rotation speed in the vehicle 210. The first electric motor MG1 is rotated and driven by motive power of the engine 12.

According to the present embodiment, as in the first embodiment and the second embodiment described above, (a) the engine 12 and the first electric motor MG1 are each disposed to be rotatable about the first axis CL1, (b) the reduction mechanism 42 includes the first planetary gear device 42*a* and the second planetary gear device 42*b*, (c) the second electric motor MG2, the first planetary gear device 42*a*, the second planetary gear device 42*b*, and the differential gear 44 are each disposed to be rotatable about the second axis CL2 parallel with the first axis CL1, (d) the second electric motor MG2, the first planetary gear device 42*a*, the second planetary gear device 42*b*, and the differential gear 44 are disposed in order from the first electric motor MG1 side to the engine 12 side in the direction of the second axis CL2, and (e) the second rotor shaft 40 is coupled to the sun gear S1 of the first planetary gear device 42*a*, the ring gear R1 of the first planetary gear device 42*a* is coupled to the sun gear S2 of the second planetary gear device 42*b*, and the carrier CA2 of the second planetary gear device 42*b* is coupled to the differential gear 44. An effect based on the components and similar to the effects of the first embodiment and the second embodiment is thus attained.

According to the present embodiment, the engine 12 and the first electric motor MG1 are directly coupled to have the same rotation speed. In a case where the engine 12 and the first electric motor MG1 are directly coupled, the engine 12 and the first electric motor MG1 disposed to be rotatable about the first axis CL1 are each allowed to have a smaller size in the direction of the first axis CL1 than in a case where, for example, the engine 12 and the first electric motor MG1 are not directly coupled, but are coupled through the speed-increasing planetary gear device 120. Preferably, for example, in a case where the first electric motor MG1 has a large diameter and is configured to be capable of efficiently generating electric power at low rotation speed, it is possible to decrease the engine 12 and the first electric motor MG1 in size in the direction of the first axis CL1 in comparison with a case where the first electric motor MG1 does not have a large diameter and is not configured to be capable of efficiently generating electric power at low rotation speed.

It is to be noted that the respective embodiments of the present disclosure have been described so far and it is possible to carry out the present disclosure in aspects for which various modifications and improvements are made based on the knowledge of those skilled in the art within the scope which does not depart from the gist of the present disclosure.

The first, second, and third embodiments described above have each exhibited an aspect in which the damper 14 is provided between the engine 12 and the first electric motor MG1, but the present disclosure is not limited to the aspect. For example, the present disclosure is also applicable to an aspect in which the damper 14 is not provided between the engine 12 and the first electric motor MG1.

The first, second, and third embodiments described above have each exhibited an aspect in which the second axis CL2 extends immediately below the engine 12, but the present disclosure is not limited to the aspect. For example, the present disclosure is also applicable to an aspect in which the second axis CL2 is shifted to any one of the front side and the rear side in the front-rear direction of each of the vehicles 10, 110, 210 with respect to the first axis CL1 and the second axis CL2 does not extend immediately below the engine 12. Even in such an aspect, the reduction mechanism 42 including the first planetary gear device 42*a* and the second planetary gear device 42*b* is restrained from having a larger outside diameter with respect to the second axis CL2 while allowed to have a higher reduction ratio. It is thus possible to dispose the engine 12 disposed to be rotatable about the first axis CL1 and the respective devices of the power train disposed to be rotatable about the second axis CL2 while restraining the inter-axis distance from increasing between the first axis CL1 and the second axis CL2. That is, the engine 12 and the respective devices of the power train are restrained from increasing in size as a whole.

What is claimed is:

1. A hybrid electric vehicle comprising:
an engine;
a first electric motor configured to be rotated and driven by the engine;
a second electric motor including an output shaft;
a reduction mechanism configured to reduce motive power of the second electric motor;
a differential gear configured to receive the reduced motive power from the reduction mechanism; and
a transaxle case configured to accommodate the first electric motor, the second electric motor, the reduction mechanism, and the differential gear, wherein:
the engine and the first electric motor are each disposed to be rotatable about a first axis;
the reduction mechanism includes a first planetary gear device and a second planetary gear device;
the first planetary gear device includes a first sun gear, a first carrier coupled to the transaxle case, a first ring gear disposed outside the first carrier, and an outer circumference gear provided to an outer circumference of the first ring gear;

the second planetary gear device includes a second sun gear, a second carrier, and a second ring gear disposed outside the second carrier and coupled to the transaxle case;

the second electric motor, the first planetary gear device, the second planetary gear device, and the differential gear are each disposed to be rotatable about a second axis parallel with the first axis;

the second electric motor, the first planetary gear device, the second planetary gear device, and the differential gear are disposed in order from the first electric motor side to the engine side in a direction of the second axis;

the output shaft of the second electric motor is coupled to the first sun gear of the first planetary gear device, the first ring gear of the first planetary gear device is coupled to the second sun gear of the second planetary gear device, and the second carrier of the second planetary gear device is coupled to a case section of the differential gear;

an outside diameter of the second ring gear of the second planetary gear device is smaller than an outside diameter of the outer circumference gear of the first planetary gear device, and an outside diameter of the case section of the differential gear is smaller than the outside diameter of the second ring gear;

the second electric motor is disposed at a position overlapping with a position of the first electric motor as viewed in a radial direction in which the second axis serves as a center;

the second planetary gear device and the differential gear are disposed at positions overlapping with a position of the engine as viewed in the radial direction in which the second axis serves as the center; and the first planetary gear device is disposed at a position not overlapping with either the position of the first electric motor or the position of the engine as viewed in the radial direction in which the second axis serves as the center.

2. The hybrid electric vehicle according to claim 1, wherein the first ring gear of the first planetary gear device is coupled to the engine such that motive power of the engine is transmitted to the first ring gear of the first planetary gear device as engine direct torque.

3. The hybrid electric vehicle according to claim 1, further comprising a third planetary gear device disposed to be rotatable about the first axis, wherein the third planetary gear device is disposed between the first electric motor and the engine in a direction of the first axis, and the engine is coupled to a third carrier of the third planetary gear device and the first electric motor is coupled to a third sun gear of the third planetary gear device.

4. The hybrid electric vehicle according to claim 3, further comprising a counter driven gear disposed between the third planetary gear device and the first planetary gear device, wherein the third planetary gear device further includes a third ring gear and a counter drive gear coupled to the third ring gear, and the counter driven gear is engaged with the counter drive gear of the third planetary gear device and engaged with the outer circumference gear of the first planetary gear device.

* * * * *